Dec. 13, 1966  A. S. HARRISON  3,290,705
MACHINE FOR UNCAPPING HONEYCOMBS
Filed Nov. 2, 1964  6 Sheets-Sheet 1

Fig.1.

ARTHUR S. HARRISON
INVENTOR

ATTORNEYS

Dec. 13, 1966  A. S. HARRISON  3,290,705
MACHINE FOR UNCAPPING HONEYCOMBS
Filed Nov. 2, 1964  6 Sheets-Sheet 4

ARTHUR S. HARRISON
INVENTOR

Huebner & Worrel
ATTORNEYS

FIG. 9.

ARTHUR S. HARRISON
INVENTOR

Huebner & Worrel
ATTORNEYS

United States Patent Office 3,290,705
Patented Dec. 13, 1966

3,290,705
MACHINE FOR UNCAPPING HONEYCOMBS
Arthur S. Harrison, P.O. Box 602, Los Banos, Calif.
Filed Nov. 2, 1964, Ser. No. 408,005
7 Claims. (Cl. 6—12)

The present invention relates to a machine for uncapping honeycombs and more particularly to such a machine which removes the cappings simultaneously from a plurality of individually planar oriented honeycomb structures supported in individual frames and housed in spaced parallel relation within an extraction super.

In the collection of bee honey the use of extraction super-hives, or supers, is well known. Conventional supers are box-shaped and contain a series of parallel open frames, each supporting a panel-like comb foundation. The bees build their honeycomb structures on the opposites of the respective foundations so that a series of parallel, thickened planar oriented sections of honeycomb is formed in the super with vertical passageways of a uniform spacing separating the sections. When the combs become full, it is then necessary in some types of honey productions to remove the caps from each section and to evacuate the honey into suitable containers for storage. The extraction may be accomplished in any practicable manner as, for instance, by centrifuging.

Prior to the present invention, this uncapping process has been cumbersome and time consuming. The foundations were generally formed of a substance such as beeswax and tended either to warp with age or under conditions of increased temperature, or to crack and disintegrate at lower temperatures. As a result, the honeycomb structures themselves would often warp or deteriorate to the point where adjacent sections were no longer uniformly spaced, and the passageways were either irregular and devious or had been blocked off entirely. Because of such structural changes and deterioration, it was generally impossible to uncap the combs while they remained housed in the super, without obtaining a conglomerate mass of wax and honey. Therefore, it was necessary to engage in the time-consuming process of removing individual frames from the supers for individual uncapping and other processing. Not only did this require excessive time and labor but also necessitated a relatively sophisticated super with removable frames.

A type of plastic foundation has now been developed which does not melt or warp under the extreme temperature conditions usually encountered in honey production. Honeycomb structures formed on such foundations tend to maintain their spacing and alignment within a super and continue to present a series of uniform capped surfaces adapted to individual simultaneous processing and uncapping. It has also been found that such a super, when once its honeycomb sections have been uncapped, is well adapted to having its honey evacuated by centrifuging or the like.

Therefore, it is an object of the present invention to provide a machine which removes cap from honeycomb structures supported on frames within a honeycomb super while the frames remain in the super.

Another object is to provide such a machine which effectively and cleanly removes the cappings from the super.

Another object is to provide such a machine which removes caps expeditiously with a minimum of time and labor.

Another object is to provide such a machine which removes caps cleanly with a minimum of mixing of the wax and honey.

Another object is to provide such a machine which simultaneously removes the caps from all the capped surfaces of the honeycomb structures in a super.

Another object is to provide such a machine which allows the use of a simplified more economical super.

Another object is to provide such a machine allowing evacuation of honey from the combs without need for individually centrifuging the frames.

These, together with other objects and advantages, will become more fully apparent on reference to the following description and the accompanying drawings.

Referring more particularly to the drawings, a honey extraction super-hive or super 10 is shown in position on a honeycomb uncapping machine represented generally at 11. It consists generally of an elongated box structure 12 open at the top 13 and bottom 14 and having end panels 15 and side panels 16 joined at the corners. A plurality of open rectangular honeycomb frames 18 are integrally mounted in parallel spaced relation within the box by attachment to the opposite end panels. Each frame includes top and bottom rim members, 19 and 20 respectively, nailed at their respective opposite ends 21 to the end panels. The frame supports a thin panel-like honeycomb foundation 24 seated securely in a groove 25 extending connectively around the inner faces 26 of the end panels and rim members. The frames are uniformly spaced at a sufficient distance to allow room for bees, not shown, to build honeycomb structures 28 out from both sides 29 of the respective foundations without blocking off the passageways 30 therebetween.

The super 10 is constructed of any suitable material, such as wood. The foundations 24 are formed preferably of a conventional type of firm, but somewhat resilient, plastic material resembling beeswax in appearance.

Figure 4:
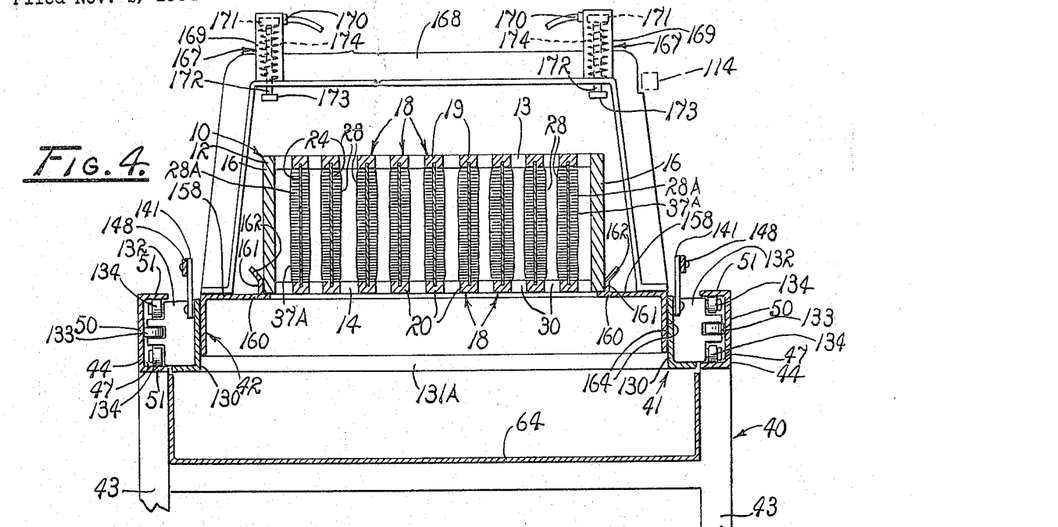
FIG. 4 is a transverse vertical section of the uncapping machine and super of FIG. 2 taken in the segmented plane represented by line 4—4 thereof.
Figure 5:
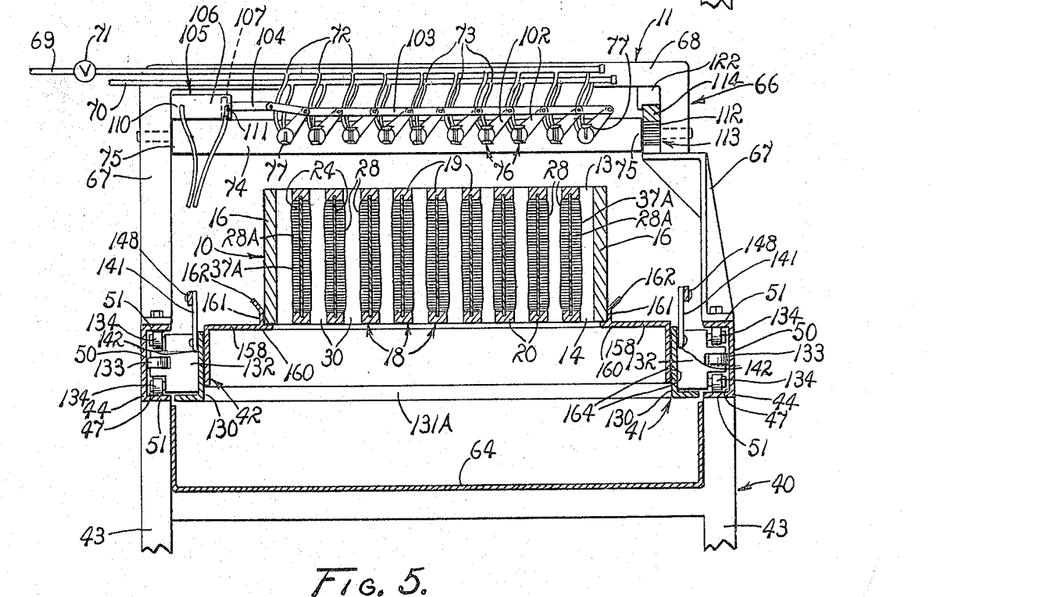
FIG. 5 is a transverse vertical section of the uncapping machine and super of FIG. 2 taken in a plane represented by line 5—5 thereof.
Figure 6:
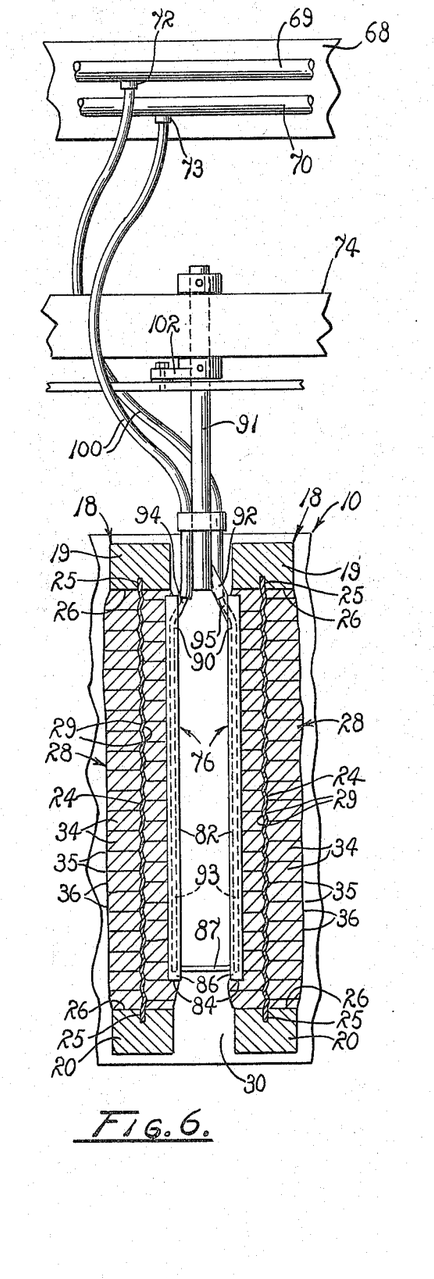
FIG. 6 is an enlarged end view of a pair of knife blades of FIG. 2 in position for cutting between adjacent frames of a fragmentarily represented super.
Figure 8:
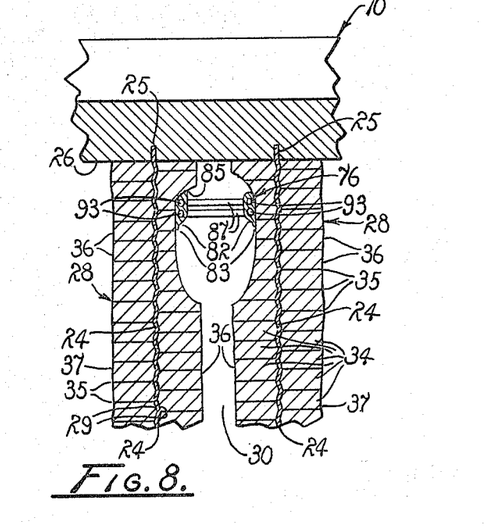
FIG. 8 is a fragmentary plan view of the extraction super and knife blades of FIG. 6 positioned therein.

When the super 10 is placed in operation for honey production, the bees commence to build cellular honeycomb structures 28 on both sides 29 of the respective foundations 24. These structures ultimately extend outwardly of the foundations and terminate a sufficient distance from the adjacent honeycomb structures to leave passageways 30 of substantially uniform parallel spacing separating adjacent frames 18 and extending through the super. The cells 34 of each structure are generally elongated and are massed in juxtaposed relation as shown in FIGS. 6 and 8, with their outer ends 35 facing the cellular ends of the adjacent structure. The bees form caps 36 over the ends to enclose the honey, not shown, stored in the cells. The contiguous caps constitute a generally uniform surface 37 along the entire side of each structure. The end result is a series of upright substantially planar oriented honeycomb structures disposed within a super in substantially equally spaced parallel layers, as shown in FIGS. 4 and 5.

The uncapping machine 11 comprises generally a base 40, a running frame 41 and a vibratile super-support frame 42 seating the super 10. The base frame is supported rigidly on upright legs 43 standing on a suitable base, not shown. It includes a pair of elongated lateral rail members 44 connected at the ends 45 by transverse bracing members 46. Each rail member is in the form of a channeled beam with its channel 47 disposed inward in parallel facing relation to its oppositely disposed counterpart. Each channel shaped rail member 44 includes a central web 50 and upper and lower flanges 51.

A ram 53, preferably pneumatically powered, is mounted at one end of the base frame 40 midway of the rail members 44 for propelling the running frame 41 and includes a horizontal cylinder 54 aligned parallel with the rail members. One end 55 of the ram cylinder is secured to the corresponding transverse bracing member 46 while its opposite outer end 56 is supported by supplementary bracing as necessary, not shown. The ram cylinder provides an expansion and a retraction port, 58 and 59 respectively, adapted preferably to accommodate compressed air. An elongated piston rod 60 projects from the inner end 55 of the cylinder and is connected conventionally inside the cylinder to a slidable hermetically sealed piston 61.

A removable collection pan 64 is mounted below the rail members 44 and covers the entire area between the members from end-to-end. The pan serves the function of collecting honey and cappings falling through the passageways 30 of the super 10 during the uncapping process.

An elongated elevated superstructure 66 is mounted on the base frame 40 in transversely bridging relation to the lateral rail members 44 and provides sufficient elevational space for insertion of a super 10 thereunder. The superstructure is disposed substantially midway of the transverse members 46 and is supported at its opposite ends on upright posts 67. It includes a rigid upper member 68 supporting separate steam supply and return lines, 69 and 70 respectively, connected through a manually operated control valve 71 to a conventional source of steam supply, not shown. The steam lines each provide a series of ports, 72 and 73 respectively, to be described below. Below the upper member and parallel therewith is an elongated knife-support member 74 having its opposite ends 75 in journalled engagement with the respective posts for rotation about a horizontal axis.

A battery of elongated parallel knives arranged in pairs 76 projects perpendicularly from the knife-support member 74. At each end of the battery is a single-blade knife member 77 adapted to uncap the outer surface 37A of the corresponding end honeycomb structure 28A.

Figure 7:
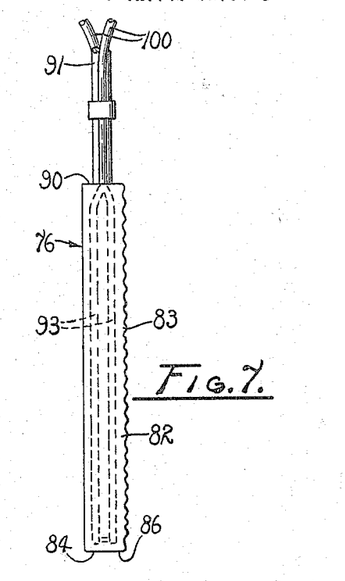
FIG. 7 is an enlarged side elevation of a knife blade of FIG. 2.

Each knife pair 76 consists of two elongated parallel hollow blades 82 preferably having a cross-sectional configuration, as shown in FIG. 8, in which the main cutting edges 83 of the respective blades are disposed in contact with the honeycomb structures 28 preparatory to translational movement therealong. The width of each blade is less than the passageway spacing between honeycomb structures so that the knife pairs may be inserted sideways into the passageways 30 without contacting the honeycomb surfaces 37. The distal edges 84 of the blade are also sharpened. The main cutting edges of the knife pairs all face the same general direction along the passageways. The cutting edges are crimped to provide a waveform as shown in FIG. 7, and more effectively to slice off the honeycomb caps 36. The opposite edge 85 of one blade in each knife pair is also sharpened to allow rotary positioning of the knife pairs when in initial contact with the capped honeycombs. The blades of each pair are connected at their distal ends 86 by hollow cross bars 87. At their proximal ends 90 the blades of each pair are secured to a central pivotal stem 91 by hollow arms 92, as shown in FIGS. 6 and 7. The stems are mounted in journalled engagement on the knife support member 74 for pivotal movement thereon. Each knife pair provides a continuous hollow passage extending through the blades, the arms and the cross bar.

The single-blade knife members 77 each provide a structure substantially identical to a knife pair 76 with the cross bar 87 and a blade 82 removed. Each blade is mounted similarly to a knife pair and is disposed for cutting engagement with the corresponding end honeycomb structure 28A without obstructive contact with the side panel 16 of the super 10.

The blades 82 are provided with suitable conduit 93 for the passage of steam therethrough. The steam serves to maintain the blades in a heated condition to enhance their cutting effect and to prevent accumulation of hardened beeswax and honey thereon. The conduit material is preferably stainless steel. Although any number of conduits may be employed in each blade, depending upon the heating effect desired, as well as the cross-sectional configuration of the blades, in the present embodiment two parallel conduits are utilized. Each conduit extends along the entire length of its respective blade and is joined with the corresponding conduit in the opposite blade through the cross bar 87. The two conduits in each blade join at the stem 91, as shown in FIGS. 6 and 7. Thus, a continuous steam passage loop is formed for each knife pair commencing at an inlet 94 adjacent to the stem and passing through both blades to terminate at an outlet 95 adjacent to the stem. The two conduits, not shown, in the respective single-blade knife members 77 remain separated at the base of the blade and are connected at their distal ends to form an integral steam supply and return loop within each blade.

The steam supply and return lines 69 and 70 in the upper member 68 of the superstructure 66 each provide a series of equispaced ports, 72 and 73 respectively, corresponding in number to the knife pairs 76 and single blade members 77 and aligned respectively therewith. Flexible conduit 10, mounted in a conventional manner, connects each supply-line port 72 with the inlet 94 of its corresponding knife pair or single-blade member. Similarly, flexible conduit connects the steam outlets 95 of the respective knives with the corresponding ports 73 of the steam return line.

Lever arms 102 are secured respectively to each stem 91 and project perpendicularly therefrom. The lever arms are aligned in mutually parallel relation and are pivotally interconnected eccentrically of the stems by a single elongated bar 103 disposed parallel to the knife-support member. The bar extends beyond the knife stems and is pivotally connected to a piston rod 104 of a conventional double-acting ram 105, preferably pneumatically powered. The ram provides a cylinder 106 mounted on the knife support member 74 and a piston 107 disposed within the cylinder for reciprocative movement parallel to the knife-support member. Expansion and retraction ports, 110 and 111 respectively, are provided in the ram cylinder for accommodation of compressed air preferably. The lever arms, the eccentric connection bar and the ram cooperate alternating to rotate the knife pairs 76 and single-blade members 77 from a position in which the blades 82 are oriented for insertion between the honeycomb frames 18 to a cutting position in engagement with the honeycomb structures 28, as shown in FIGS. 6 and 8.

One end of the knife support member 74 is geared to form a pinion 112. It is combined in a rack and pinion mechanism 113 with a rack 114 disposed perpendicularly of the support member and connected preferably rigidly to the piston rod 115 of a conventional double-acting ram 116, preferably pneumatically powered. The ram consists of a cylinder 117 mounted on an upright post 119 at the side of the base frame 40 with its piston rod 115 disposed for horizontal reciprocative movement perpendicular to the support member. It is provided with suitable expansion and retraction ports, 120 and 121 respectively, adapted preferably to accommodate compressed air. The rack is constrained for geared contact with the support-member pinion by a grooved block 122 attached to the upper member 68 of the superstructure 66.

Figures 2, 3:
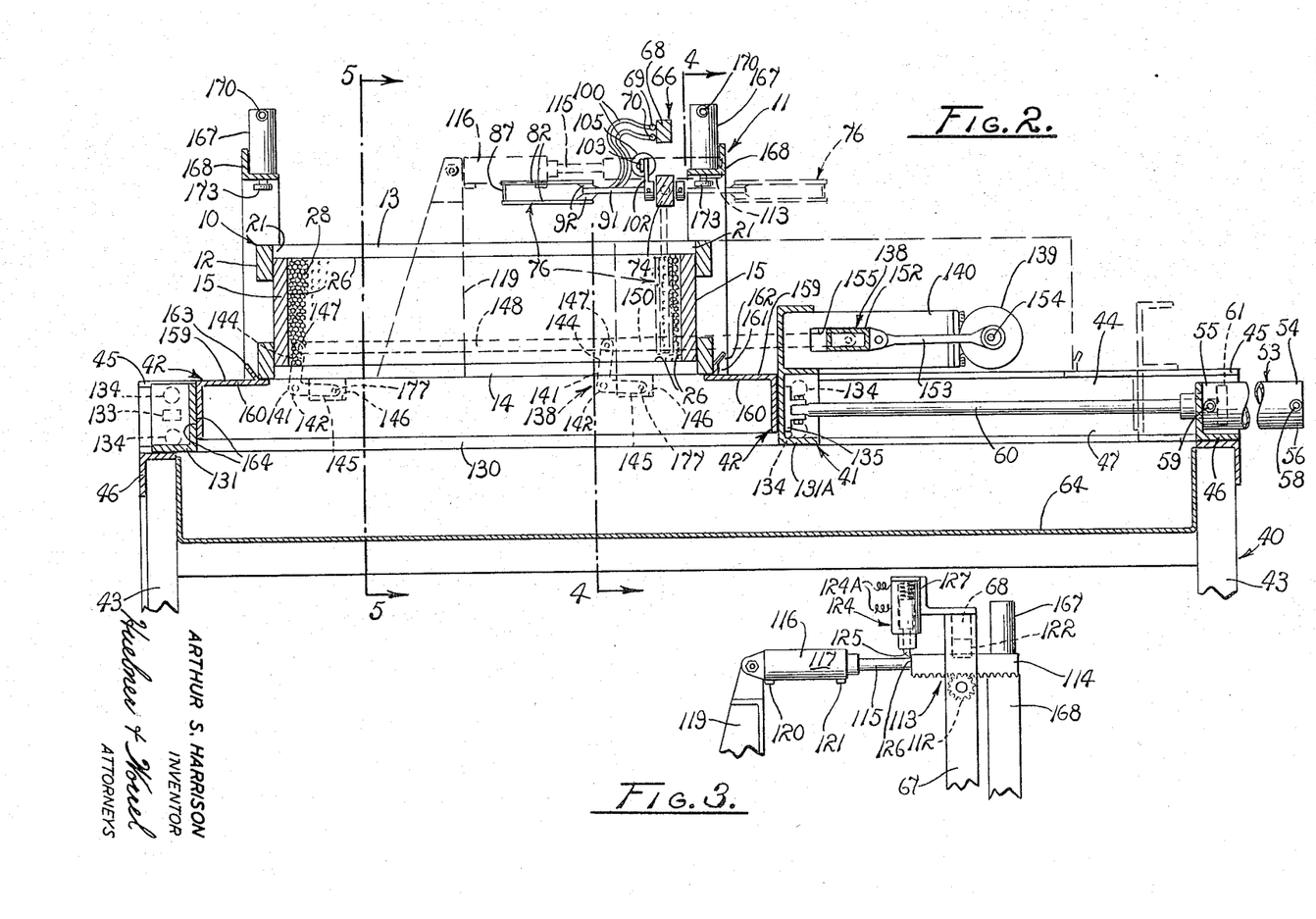
FIG. 2 is a longitudinal vertical section of the uncapping machine of FIG. 1 taken in a plane represented by line 2—2 thereof and showing the knife blades in their raised initial position.
FIG. 3 is a fragmentary side view of the knife pair positioning mechanism of the present invention including a solenoid operated detent for locking the knives in their vertical operative position.

The rack and pinion mechanism 113 and its associated ram 116 cooperate to rotate the knife-support member 74 about a horizontal axis from an initial position in which the knife blades 82 are disposed horizontally above the super 10, as shown in FIG. 2, to an operative position in which the knife blades depend preferably substantially vertically from their support member, as shown in FIG. 2, to an intermediate position in which the knife blades are elevated horizontally above the super oppositely of their initial position, as shown in FIG. 2, and finally to return the knife blades to their initial position.

A latch device 124 is mounted above the rack 114 and provides a downwardly directed elevationally reciprocative detent 125. The detent is disposed for selectively gripping one end 126 of the rack effectively to lock the support member 74 in its operative position with the knife blades 82 held substantially vertical. The device is preferably solenoid operated. The detent is normally held in a retracted position, preferably by a tension spring 127, and propelled downward to engage the rack upon activation of the solenoid, not shown, by an electric current. When the rack is thus locked, the knives are held rigidly in operative position by the pneumatic pressure of the ram acting in opposition tod the resistance offered by the detent. Upon deactivation of the current the detent returns to its retracted position and the rack is released.

The running frame 41 is a rectangular structure formed of elongated lateral members 130 and end members 131. Projecting laterally from the respective ends of the end members are four roller-support arms 132 each of which mounts three ball-bearing rollers. As shown in FIG. 5, a central roller 133 is disposed for rotation about a vertical axis while maintaining contact with the central web 50 of the corresponding rail member 44. The two additional rollers 134 are disposed for rotation about horizontal axes while maintaining contact respectively with the upper and lower flanges 51 of the rail member. The combination of rollers when seated on the rail members provides a firm support for the running frame while maintaining it continuously in precise parallel alignment with the base frame 40.

The running frame 41 is propelled longitudinally of the base frame 40 by the pneumatic ram 53. The extent of its travel is limited only by the transverse bracing members 46. The piston rod 60 is secured pivotally to the adjacent end member 131A of the running frame, at the midpoint thereof. A mounting pad 135 may be provided therefor.

The running frame 41 supports a vibratory system 138 for imparting elevational oscillation to the vibratile super-support frame 42. It is motivated by an electric motor 139 mounted on a bracket 140 projecting preferably from end member 131A of the running frame. At least two double-arm lever members 141 are mounted for pivotal movement on each lateral member 130 of the running frame. Their central apices 142 are pivotally attached to the outside of the running frame, as shown in FIG. 5. One arm 144 of each lever is disposed generally in an upright position while the lower arm 145 extends preferably in the general direction of the motor and is curved inwardly to fit into a cut-away portion 146 of the running frame for pivotal attachment to the vibratile frame, as will be described.

The distal ends 147 of the upright arms 144 are pivotally attached respectively to two elongated horizontally reciprocative rods 148, one on each side of the running frame 41 and extending longitudinally thereof. These offset levered rod assemblies are connected respectively pivotally to intermediate rods 150 which in turn are pivotally connected to the opposite ends of a transverse yoke 152 disposed beyond the end member 131A of the running frame. The yoke is pivotally connected to a pitman arm 153 having eccentric pivotal connection to the motor drive shaft 154 and is motivated by the motor 139 in horizontal reciprocative movement longitudinally of the base frame 40. Slotted apertures 155 in the motor-support bracket 140 accommodate the yoke during said movement. Thus, during operation of the motor, the offset rods 148 reciprocate rapidly causing the lever members 141 to oscillate pivotally and to impart an elevationally oscillatory movement to the vibratile frame 42, as will be described.

The vibratile super-support frame 42 is a rectangular-shaped structure having respective side and end members 158 and 159 with inwardly projecting flanges 160 adapted to seat a super 10 without obstructing its passageways 30. The flanges serve to position the super in spaced relation to the base and running frames 40 and 41 so as to prevent the accumulation of honey and beeswax thereon. A super 10 is constrained in accurate horizonal alignment on the vibratile frame by a rectangular vertical flange 161 having an outwardly flared upper edge 162 allowing ease of insertion of the super. The outward flaring is accentuated along one portion 163 of the flange to allow more convenient seating of the super.

The vibratile frame 42 fits within the running frame 41 with their respective side and end members 130 and 158, and 131 and 159, disposed in free-sliding engagement. The engaged surfaces 164 are preferably machined to give optimum inter-action between the two frames. The vibratile frame is preferably restricted to elevational movement only so that accurate alignment of the super 10 with the knife blades 82 is maintained.

The super 10 is secured to the vibratile frame 42 by conventional single-acting rams 167, preferably pneumatically powered and positioned preferably at the corners 17 of the super. The rams are carried by a superstructure 168 mounted on the vibratile frame 42 in bridging relation to the super. Each ram includes a cylinder 169 with a single expansion and retraction port 170 adapted preferably to accommodate compressed air and an internal piston 171 with a downwardly projecting piston rod 172 having a clamping head 173 adapted to engage the upper corners of the super. The ram includes a spring return 174 for returning the piston to a retracted position upon release of the pneumatic pressure.

Figure 1:
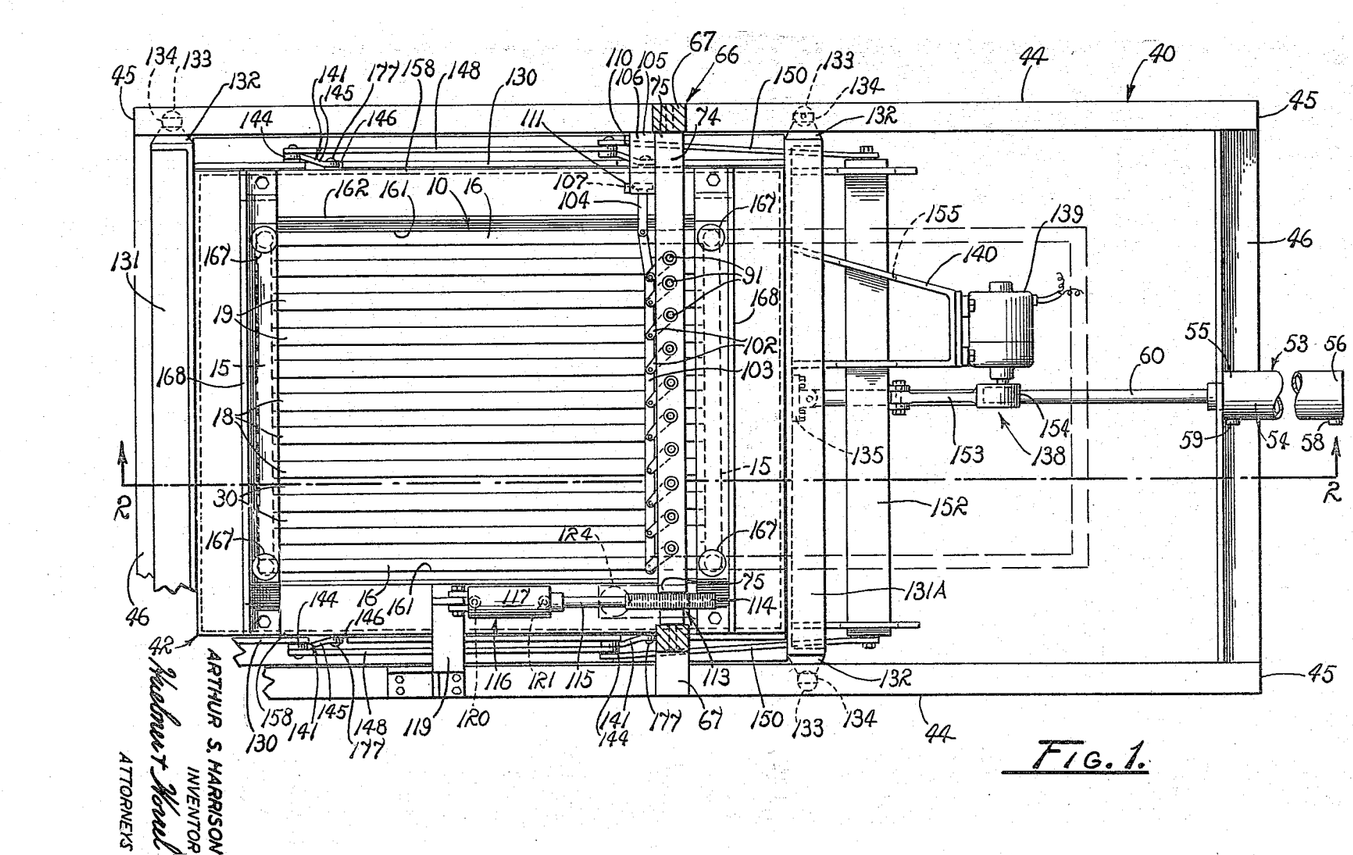
FIG. 1 is a fragmentary top plan view of the honeycomb uncapping machine of the present invention with parts broken away and an extraction super shown mounted thereon ready for uncapping.

The vibratile frame 42 is mounted on the lower arms 145 of the double-arm lever members 141, to which it is connected pivotally at selected pivot points 177 registered with the cut-away portions 146 of the running frame 41 as shown in FIGS. 1 and 2. When the lever members are actuated by the motor 139, the vibratile frame, motivated by the lower lever arms, is vibrated elevationally at a predetermined oscillation depending upon the speed of rotation of the motor.

Although separate manual switches and valves, not shown, may be provided for actuating the motor 139, the rams 53, 105, 116 and 167 and the latch device 124, it is preferable to utilize an automatic control system. Conventional control techniques offer various practicable systems for this purpose, however, for convenient illustration, the system shown diagrammatically in FIG. 9 will be described.

Figure 9:
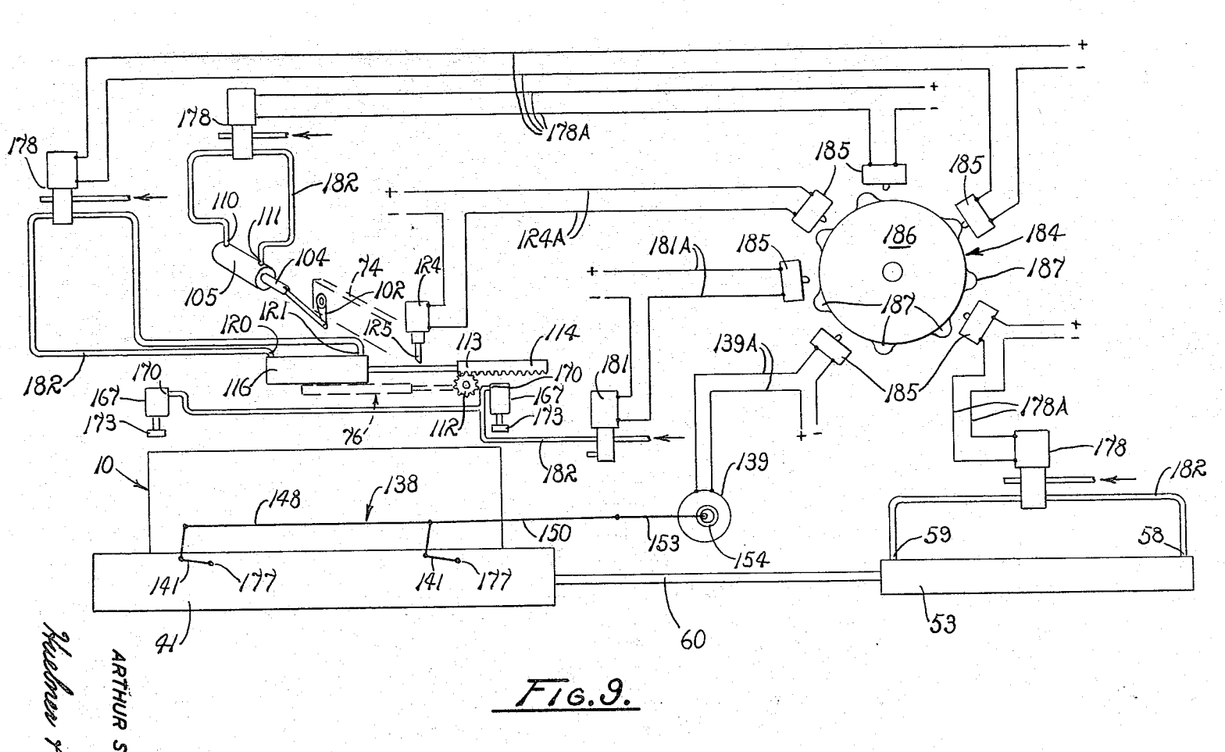
FIG. 9 is a schematic diagram of the automatic control system of the present invention showing the clock timer adapted to control the sequential operation of the various operative elements of the invention.

A suitable source of pressurized gas or air, such as a compressor or a pressurized cylinder, not shown, is mounted preferably on the base frame 40. In the illustrative example compressed air is used. Each double-acting ram 53, 105 and 116 is controlled by a conventional solenoid-actuated four-way control valve 178. The clamping rams 167 are controlled conjunctively by a single solenoid-operated two-way control valve 181. The respective expansion and retraction ports of the rams are connected to the source of compressed air through the corresponding valves by means of flexible conduit 182. One discharge port, not shown, in each valve serves as an exhaust and leads to atmosphere. A source of electrical D.C. current, not shown, is connected through conventional wiring circuits 178A, 181A, 124A and 139A respectively to the solenoid-operated valves, the latch device 124, and the motor 139 effectively individually to activate same.

A suitable clock timer 184 is mounted on the base frame 40 and is connected through conventional wiring, not shown, to the respective circuits 178A, 181A, 124A and 139A. The timer includes micro-switches 185 for selectively and successively closing and opening the circuits. The timer provides a rotary timing element 186 having tripping elements 187 disposed thereon for closing and opening the switches in a predetermined timed sequence to actuate the operating elements of the uncapping machine according to the following sequence of operation.

*Operation*

The operation of the described first embodiment of the subject invention is believed to be clearly apparent and is briefly summarized at this point. Preparatory to commencing operation, the running frame 41 is positioned at the end of the base frame 40 remote from the running frame ram 53, with the blades 82 disposed in their elevated initial position as shown in FIG. 2. A super 10 filled with capped honeycomb structures 28 is seated securely on the vibratile frame 42 beneath the blades with its passageways 30 aligned respectively therewith. The steam valve 71 is opened allowing steam to heat the blades.

The timer 184 is set at a cycle starting point and then activated to commence the uncapping operation. The clamping heads 173 move downward to secure the super 10. At the same time the knife blades 82 are swung into their vertical operative position between the respective frames 18 by actuation of the rack and pinion mechanism 113. The detent 125 is activated locking the blades in their vertical orientation and, the knife pairs 76 and single-blade members 77 are rotated horizontally positioning the blades in cutting position, as shown in FIG. 8. The motor 139 is then activated causing the vibratile frame 42 and super to vibrate elevationally. The running frame ram 53 retracts at a predetermined speed and draws the super through the blades so that their cutting edges 83 slice the caps 36 from the honeycomb structures 28. At the same time, the vibration of the super dislodges the cut cappings, not shown, which thereupon fall through the passageways 30 onto the collection pan 64. Thus, at the end of one pass of the super there is provided a set of cleanly uncapped honeycomb structures which are completely free of wax cuttings but which retain honey by capillary attraction and are ready for subsequent extraction operations. The vibrating super co-operates with the steam-heated blades to allow their cutting cleanly through the honeycomb caps and to eject the uncappings freely onto the pan without mixing the severed beeswax with the honey remaining in the honeycomb.

At the end of the pass the ram 53 stops, the detent 125 retracts, the knife pairs 76 and single blades 77 are rotated horizontally freeing them from the honeycomb structures 28 and then swung vertically to a position above the super 10, as shown in FIG. 2, the ram expands to return the running frame 41 and super to their original position, the motor 139 is shut off discontinuing the vibratory action, the clamping rams 167 are retracted from their engagement with the super, the super is manually removed, the blades swung to their initial position and the clock timer 184 returns to the starting point of its cycle ready to guide the machine through another identical sequence. Alternatively, the timer and un-capping machine may be deactivated at this point. By such automatically controlled operation of the present invention it is readily apparent that only one worker, not shown, is required to carry out the uncapping process. If more than one machine is utilized, it is still only necessary for one worker to be present to turn the clock timer on and off and to insert and remove supers between cycles.

*Second embodiment*

Figure 10:
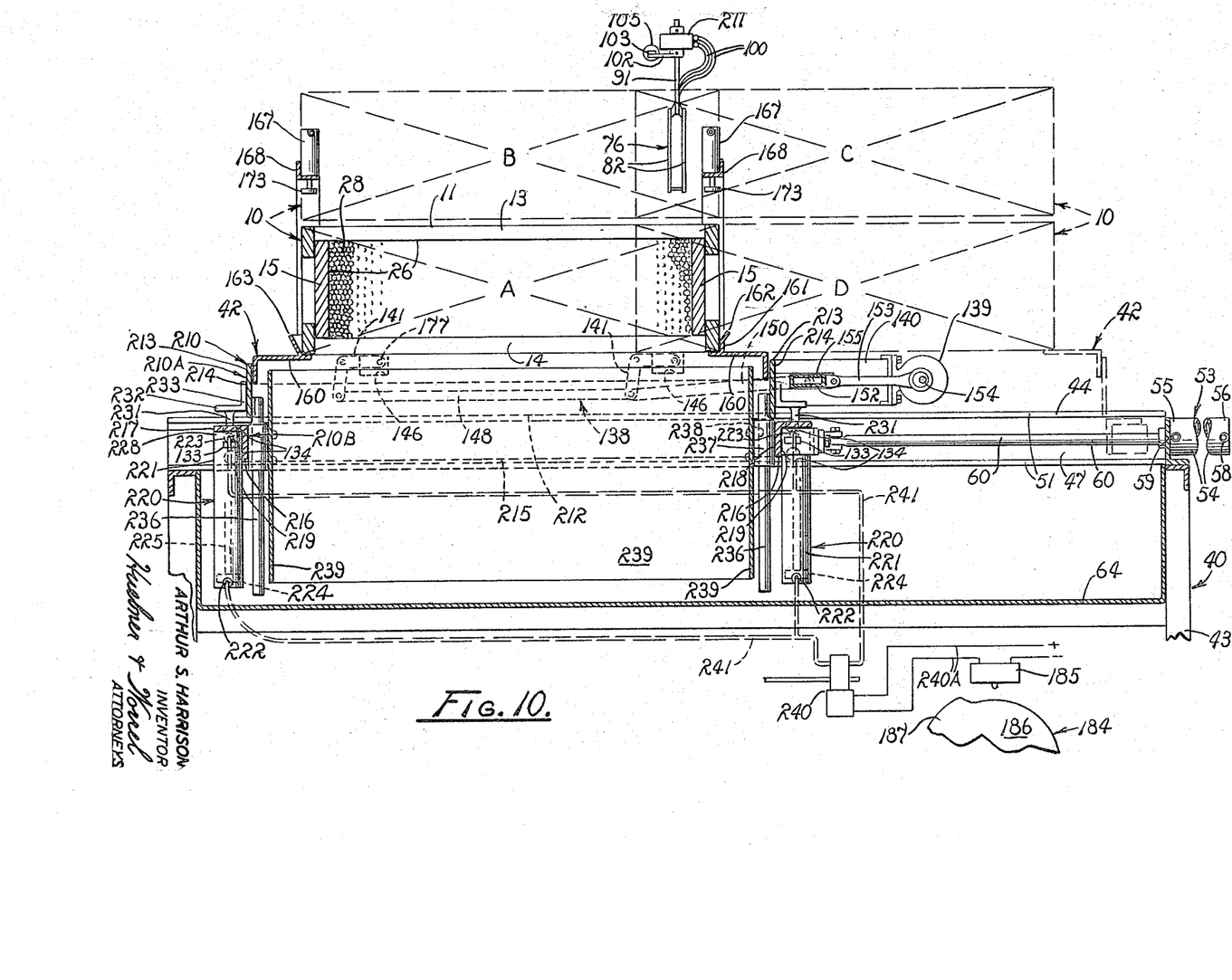
FIG. 10 is a longitudinal vertical section of the second form of the present invention showing schematically the sequential positions of the super during one cycle of the operative process.

The second embodiment of the subject invention, shown in FIG. 10, generally includes elements identical to those of the first embodiment, and which are designated respectively by the same numerals. The sole differences reside in the structure and mounting of the running frame 210 and the mounting of the blades 82. The knife pairs 76 and single blade members 77 are mounted in depending elevated relation on a non-rotatable knife-support member 211 and the super 10 is positioned for uncapping by raising the running frame and super into the blades, rather than by swinging the blades into the super.

The running frame 210 is composed of an upper running frame 210A and a lower running frame 210B. The upper frame is formed of elongated side and end members 212 and 213 respectively, having substantially vertical outer surfaces 214. The lower frame is formed of elongated side and end members 215 and 216 respectively. The end members 216 each have a flange 217 projecting outwardly therefrom and substantially vertical inner and outer surfaces 218 and 219 respectively. The upper frame is superposed above the lower frame for elevational movement relative thereto. It is supported at the midpoints of its opposite end members 213 by conventional double-acting rams 220, preferably pneumatically powered, mounted on the outer surfaces of the end members of the lower frame. The rams include cylinders 221 having expansion and retraction ports 222 and 223 respectively, adapted preferably to accommodate compressed air, and an internal piston 224 with its piston rod 225 projecting upward. The upper ends 228 of the cylinders are secured respectively to the projecting flanges 217 of the lower frame and moveable therewith. The upper ends 231 of the piston rods are secured, as by butt welding, to projecting flanges 232 of angle members 233 mounted on the respective outer surfaces 214 of the upper running frame. The rams are sized to allow elevation of the upper frame to position B, or C, as shown in FIG. 10.

The upper running frame 210A is guided in its elevational movement relative to the lower frame 210B by cylindrical rods 236 rigidly affixed to the inner surfaces of the respective end members 213 of the upper frame and depending therefrom. The rods are constrained in tubular guides 237 affixed to the inner surfaces 218 of the respective end members 216 of the lower frame, for sliding elevational movement therein. The contact surfaces 238 of the guides and the rods are preferably machined and lubricated to allow free relative movement. The guide rods serve to maintain the upper frame in fixed horizontal and vertical orientation when disposed in elevated position B or C.

The lower frame 210B includes roller support arms identical to the support arms 132 in the first embodiment but not shown in FIG. 10. The support arms mount rollers 133 and 134 identical to those described in the first embodiment and disposed for rolling engagement with the rail members 44. A suitable skirt 239 is affixed to the lower running frame to shield the rams and guide rods from honey and beeswax discharged from a super 10.

The elevating rams 220 for the upper running frame 210A are automatically controlled by the clock timer 184 through a conventional four-way solenoid-operated pneumatic valve 240. The valve is connected through a conventional electrical circuit 240A to the D.C. source, not shown, and through flexible conduit 241 to the respective expansion and retraction ports 222 and 223 of the ram. The timer is substantially similar to that of the first embodiment, except that switching elements for a latch device and a rack and pinion mechanism are not necessary, since those elements are not included in the second embodiment.

Operation of second embodiment

The operation of the second embodiment of the subject invention is believed to be clearly apparent and is briefly summarized at this point. With the upper running frame 210A in its lower position A a super 10 is placed in position on the vibratile frame 42. A steam valve, not shown, is opened to allow steam to commence heating the knife blades 82. The clock timer 184 is set for initial commencement and then activated. Thereupon, the clamping rams 167 secure the super, the upper running frame is raised by the expanding rams 220 so that the blades are disposed between the frames 18 of the super. The knife pairs 76 and single-blade members 77 are rotated horizontally so as to assume their cutting position, as shown in FIG. 8. The motor 139 is activated causing the super to vibrate and the complete running frame 210 is drawn by the running-frame ram 53 along the length of the rail members 44 until the knife blades have cut the caps 36 from the honeycomb structures 28. Then, the knife blades are rotated horizontally to free the blades and the upper frame is lowered. The motor is deactivated, the clamping rams are retracted and the super is removed. The running frame is then returned to its original position as the timer completes one complete cycle. At this point the operation can then be repeated in the identical sequence. It should be noted that during the cutting operation, the vibration of the super dislodges the cut cappings causing them to fall through the super passageways 30 onto the collection pan 64. Thus, as with the first embodiment, at the completion of the cycle a super having cleanly uncapped honey-filled combs is provided, ready for subsequent extraction procedures.

From the foregoing it is readily apparent that a machine has been provided which cleanly removes the caps from honeycomb structures housed in a super while the honeycomb frames remain in the super. It thus allows subsequent extraction of the honey by centrifuging the super and affords substantial savings in time and labor. Furthermore, the uncapping is accomplished expeditiously without mixing the cappings with honey into a worthless conglomeration unsuitable for further separation of the honey.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a machine for uncapping a plurality of substantially planar oriented honeycomb structures arranged in spaced substantially parallel layers and having elongated end-capped cells disposed in contiguous juxtaposed relation within layers and in end-to-end relation between adjacent layers, a plurality of elongated knives each having opposite ends, said knives being adapted to separate the caps from said cells by slicing contact therewith; means supporting said knives at one end thereof in pairs and in spaced parallel relation for unitary rotational movement by respective pairs, each pair having an axis of rotation disposed between the knives of the pair and substantially parallel thereto; means for positioning the respective pairs of knives between said structures; means for rotating the knife pairs into slicing contact with the respective honeycomb structure; and means for effecting slicing relative movement between the knives and the honeycomb structures to separate the caps from the cells along the entire respective sides of each structure.

2. In a machine for uncapping a plurality of individually substantially planar oriented honeycomb structures housed in a honey extraction super in substantially parallel spaced layers and having opposite sides, said structures comprising elongated end-capped cells disposed in contiguous juxtaposed relation within layers and in end-to-end relation between layers, a plurality of elongated knives having opposite ends and being adapted to separate the caps from said cells by slicing contact therewith; means supporting said knives at one end thereof in pairs and in spaced parallel relation for unitary rotational movement by respective pairs about axes disposed between the knives in the respective pairs and parallel thereto, said pairs of knives being disposable individually simultaneously between respective adjacent honeycomb structures; means for individually and simultaneously positioning said pairs of knives between said structures and rotating said pairs into slicing contact with said structures; means for effecting slicing relative movement between the knives and the honeycomb structures effectively to separate the caps from the cells along the entire respective sides of each structure; and means for heating the knives during said cap separation.

3. In a machine for uncapping a plurality of individually planar oriented honeycomb structures housed in a honey extraction super in spaced layers having opposite sides, said structures comprising elongated end-capped cells disposed in contiguous juxtaposed relation within layers and in end-to-end relation between layers, a plurality of elongated knives having respective opposite ends and being adapted to separate the caps from said cells by slicing contact therewith; means supporting said knives at one end thereof in spaced parallel paired relation for unitary rotational movement by respective pairs of knives to a cutting position while maintaining the parallel relation, each pair of knives having an axis of rotation extending between the knives of the pair and substantially parallel thereto, said supporting means maintaining said pairs of knives with the axes of rotation disposed in substantially equally spaced planar oriented relation; means for rotatably positioning said pairs of knives between said structures and in slicing contact therewith; means for effecting slicing relative movement between the knives and the honeycomb structures effectively to separate the caps from the cells along the entire respective sides of each structure; and means for maintaining the knives in a heated condition during said cap separation.

4. A machine for uncapping honeycombs contained in an extracting super having a plurality of rectangular honeycomb frames supporting individually substantially planar oriented honeycomb structures providing opposite sides, and a plurality of elongated cells having capped ends, said frames being disposed in the super with their honeycomb structures in spaced substantially upright parallel relation so as to provide substantially vertical parallel passageways through the super between adjacent structure, said cells being disposed in contiguous juxtaposition within each structure and in end-to-end spaced relation between structures so that the capped cell ends form the sides of each structure, said machine comprising a plurality of elongated knives disposed in spaced parallel relation and adapted to separate the caps from the cells; means supporting said knives at one end thereof in pairs for unitary rotational movement by respective pairs while maintaining their parallel relation, each pair having an axis of rotation disposed substantially midway of the knives of the pair and substantially parallel thereto; means for alternately raising and lowering said knives between a first position in which the knives are elevated above the super and a second position in which they are respectively interspersed in upright orientation in the adjacent passageways between the frames and parallel therewith; means for effecting translational slicing contact between the knives in the second position and the capped ends of the cells to uncap ends along the entire side of each honeycomb structure; and means maintaining the knives in a heated condition during said slicing contact.

5. A machine for uncapping honeycombs contained in an extracting super, said super housing a plurality of honeycomb frames having a length and a width and supporting individually substantially planar oriented honeycomb structures having opposite sides, said structures comprising a plurality of elongated cells having capped ends, said frames being disposed in the super with their honeycomb structures being individually substantially upright and mutually in spaced substantially parallel relation so as to provide substantially vertical parallel passageways through the super, said cells being disposed in contiguous juxtaposition within each structure and in end-to-end spaced relation between structures so that the capped cell ends form the sides of each structure, said machine comprising a plurality of elongated knives disposed in spaced parallel relation and adapted to separate the caps from the cells; means supporting said knives at one end thereof in pairs for unitary rotational movement by respective pairs while maintaining their parallel alignment, each pair having an axis of rotation disposed substantially midway of the knives of the pair and substantially parallel thereto, said knife support means maintaining the axes of rotation in substantially planar oriented relation; means for alternately lowering and raising said knives between a first position in which the knives are elevated above the super and a second position in which they are respectively interspersed in upright orientation in the adjacent passageways between the frames and parallel therewith; means rotatably positioning the pairs of knives between the frames to dispose the knives in a third, cutting position; means effecting translational slicing contact between the knives in the third position and the capped ends of the cells effectively to uncap said ends along the entire side of each honeycomb structure; and means maintaining the knives in a heated condition during said slicing contact.

6. A machine for uncapping honeycomb structures which are supported in a super in spaced substantially parallel layers each providing opposite side surfaces formed by the caps of the cells in the honeycomb comprising means for supporting the super in a position with the layers in a substantially upright position; a plurality of elongated cutting blades of predetermined length, thickness and width and affording at least one cutting edge, the length being substantially equal to the elevational dimension of the layers when supported in said upright position; means supporting the blades in spaced paired relation between adjacent layers and with individual blades at the respective opposite remote side surfaces in the super, the transverse spacing of the paired blades being greater than the spacing between the side surfaces of adjacent layers so that translational movement of the blade along the layer cuts the caps from the honeycomb cells; means supporting the blades for limited rotation about an axis parallel to and spaced from the longitudinal axis of the blades, the rotational axis being midway of the paired blades; and for rotation of the blades about a transverse axis adjacent to one end of the blade; means for positioning the blades by movement of the blades between a first retracted position and a second cutting position wherein said blades are substantially vertically disposed with their respective cutting edges in contact with the honeycomb structure immediately below the side surfaces formed by the cell caps; means for supplying a heating medium to said blades; power means for effecting elevationally vibratory movement of the super relative to the blades in said cutting position; power means to effect translational movement of the blades relative to the honeycomb layers in a direction substantially parallel to the side surfaces to remove the end caps from the honeycomb; and control means connected to said knife positioning means, the vibratory means, the power means for translational movement of the knives and the heating means to effect sequential positioning of the knives, heating thereof, translational movement along the honeycomb layers with concurrent vibratory movement of the super, and withdrawal of the knives to said first retracted position upon completion of the slicing of the side surfaces of the layers.

7. A machine for uncapping honeycombs contained in an extracting super, said super housing a plurality of honeycomb frames having a length and a width and supporting individually substantially planar oriented honeycomb structures having opposite sides, said structures comprising a plurality of elongated cells having capped ends, said frames being disposed in the super with their honeycomb structures being individually substantially upright and mutually in spaced substantially parallel relation so as to provide substantially vertical parallel passageways through the super, said cells being disposed in contiguous juxtaposition within each structure and in end-to-end spaced relation between structures so that the capped cell ends form the sides of each structure, said machine comprising a plurality of elongated knives disposed in spaced parallel substantially coplanar oriented relation and adapted to separate the caps from the cells; means supporting said knives at one end thereof for unitary rotational movement by respective pairs of knives while maintaining their parallel alignment, each pair having an axis of rotation disposed substantially midway of the knives of the pair and substantially parallel thereto; means alternately lowering and raising said knives between a first position in which the knives are elevated above the super and a second position in which they are respectively interspersed in upright orientation in the adjacent passageways between the frames and parallel therewith; means rotatably positioning the pairs of knives between the frames to dispose them in a third, cutting position; means effecting translational slicing contact between the knives in the third position and the capped ends of the cells effectively to uncap said ends along the entire side of each honeycomb structure; means maintaining the knives in a heated condition during said slicing contact; and means imparting elevational vibration to the slicing contact between the knives and the capped ends of the cells to enhance the uncapping process and to dislodge the separated caps from the super.

References Cited by the Examiner

UNITED STATES PATENTS

| 1,779,469 | 10/1930 | Gran | 6—12 |
| 2,272,808 | 2/1942 | McFadyen | 6—12 |
| 2,631,307 | 3/1953 | Sugano | 6—12 XR |
| 3,091,780 | 6/1963 | Smithson | 6—12 |

ALDRICH F. MEDBERY, *Primary Examiner.*

LUCIE H. LAUDENSLAGER, SAMUEL KOREN,
*Examiners.*